US009252676B2

(12) United States Patent
Yang et al.

(10) Patent No.: US 9,252,676 B2
(45) Date of Patent: Feb. 2, 2016

(54) ADAPTIVE ACTIVE CLAMP OF FLYBACK POWER CONVERTER WITH HIGH EFFICIENCY FOR HEAVY LOAD AND LIGHT LOAD

(71) Applicant: SYSTEM GENERAL CORP., Taipei Hsien (TW)

(72) Inventors: Ta-yung Yang, Milpitas, CA (US); Chih-hsien Hsieh, Changhua County (TW); Kai-fang Wei, Hsinchu (TW); Jung-sheng Chen, Kaohsiung (TW)

(73) Assignee: System General Corp., Taipei Hsien (TW)

( * ) Notice: Subject to any disclaimer, the term of this patent is extended or adjusted under 35 U.S.C. 154(b) by 173 days.

(21) Appl. No.: 14/182,442

(22) Filed: Feb. 18, 2014

(65) Prior Publication Data
US 2014/0233275 A1 Aug. 21, 2014

Related U.S. Application Data

(60) Provisional application No. 61/765,846, filed on Feb. 18, 2013.

(51) Int. Cl.
*H02M 3/335* (2006.01)
*H02M 1/00* (2007.01)

(52) U.S. Cl.
CPC .. *H02M 3/33576* (2013.01); *H02M 2001/0032* (2013.01); *Y02B 70/16* (2013.01)

(58) Field of Classification Search
CPC ................. H02M 2001/0032; H02M 3/33576; H02M 3/33507
See application file for complete search history.

(56) References Cited

U.S. PATENT DOCUMENTS

| 5,570,278 | A | 10/1996 | Cross |
| 6,069,803 | A | 5/2000 | Cross |
| 7,006,364 | B2* | 2/2006 | Jin ........................ H02M 1/08 363/131 |
| 7,193,867 | B2* | 3/2007 | Aso ................... H02M 3/33569 363/133 |
| 7,349,229 | B1 | 3/2008 | Yang |
| 7,382,633 | B2* | 6/2008 | Aso ...................... H02M 3/335 363/21.04 |
| 7,426,120 | B2 | 9/2008 | Yang et al. |
| 7,471,523 | B2 | 12/2008 | Yang |
| 7,502,236 | B2* | 3/2009 | Baurle ................. H02M 3/335 363/21.15 |
| 8,009,448 | B2* | 8/2011 | Liu ................... H02M 3/33569 363/21.01 |
| 8,094,468 | B2 | 1/2012 | Yang et al. |
| 8,488,348 | B2* | 7/2013 | Hong ................ H02M 3/33569 363/21.18 |
| 8,582,326 | B2* | 11/2013 | Hosotani ................ H02M 1/34 363/21.05 |
| 8,693,223 | B2* | 4/2014 | Lin ................... H02M 3/33507 363/21.03 |
| 2007/0115699 | A1* | 5/2007 | Yang ................ H02M 3/33569 363/21.03 |

(Continued)

*Primary Examiner* — Jue Zhang
*Assistant Examiner* — Lakaisha Jackson
(74) *Attorney, Agent, or Firm* — Rosenberg, Klein & Lee

(57) ABSTRACT

A control circuit of a flyback power converter according to the present invention comprises a low-side transistor, an active-clamper, a high-side drive circuit, and a controller. The low-side transistor is coupled to switch a transformer. The active-clamper is coupled in parallel with the transformer. The high-side drive circuit is coupled to drive the active-clamper. The controller generates a switching signal and an active-clamp signal. The switching signal is coupled to drive the low-side transistor. The switching signal is generated in accordance with a feedback signal for regulating an output of the flyback power converter. The active-clamp signal is coupled to control the high-side drive circuit and the active-clamper. The active-clamp signal is generated in response to a demagnetizing time of the transformer. The pulse number of the active-clamp signal is less than the pulse number of the switching signal in a light load condition.

16 Claims, 16 Drawing Sheets

(56) References Cited

U.S. PATENT DOCUMENTS

| | | | |
|---|---|---|---|
| 2011/0305048 A1* | 12/2011 | Yang | H02M 1/083 363/21.03 |
| 2012/0069608 A1 | 3/2012 | Yang et al. | |
| 2012/0081084 A1 | 4/2012 | Yang et al. | |
| 2014/0185333 A1* | 7/2014 | Yang | H02M 3/33569 363/21.12 |
| 2014/0307484 A1* | 10/2014 | Yang | H02M 3/33569 363/21.12 |

* cited by examiner

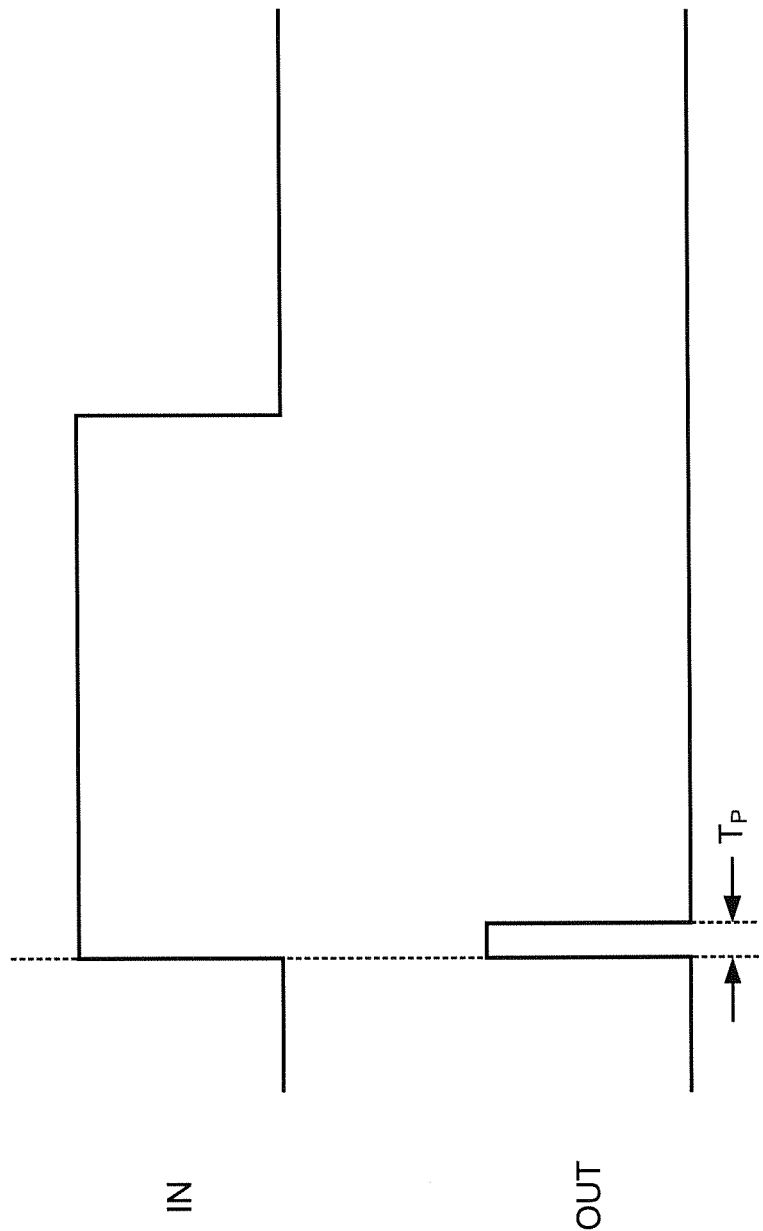

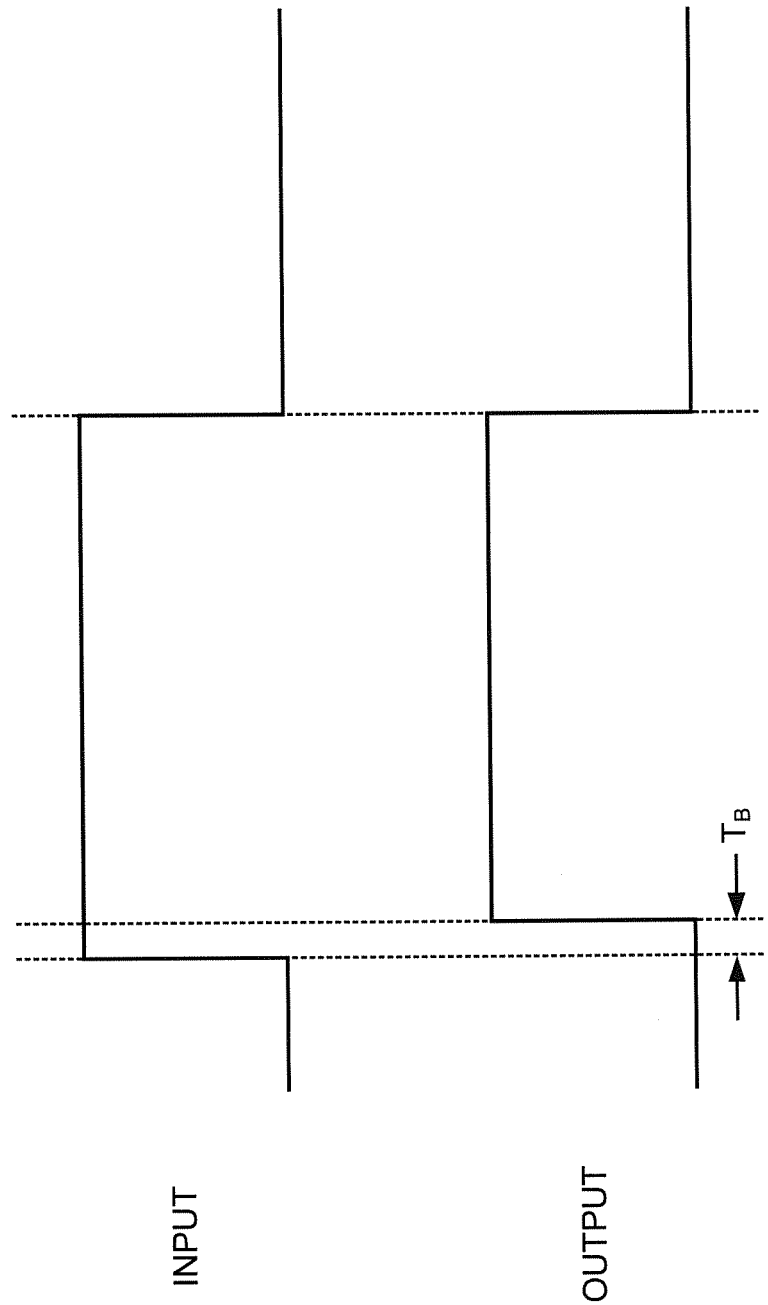

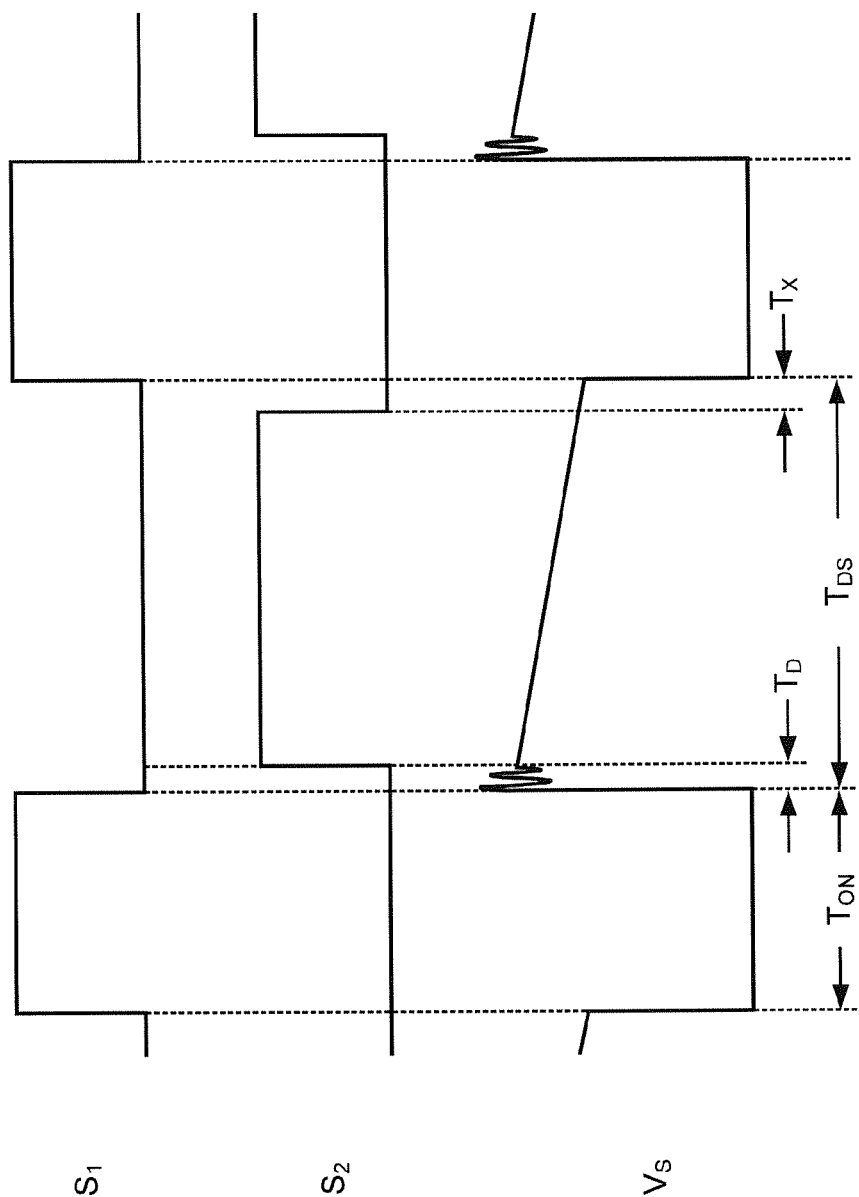

ADAPTIVE ACTIVE CLAMP OF FLYBACK POWER CONVERTER WITH HIGH EFFICIENCY FOR HEAVY LOAD AND LIGHT LOAD

BACKGROUND OF THE INVENTION

1. Field of the Invention

The present invention relates to power converter, and more particularly, relates to the control circuit of the flyback power converter with active clamp.

2. Description of the Related Art

Flyback power converters have been widely used to provide power supplies for electronic products, such as home appliances, computers, battery charger etc. An active-clamp circuit has developed for the flyback power converter, that increases the efficiency of the flyback power converter. Nevertheless, the traditional active-clamp circuit can only achieve high efficiency for the heavy load. The drawback of the traditional active-clamp circuit is the higher power loss at the light load because of the high circulated current. The objective of this invention is to improve the efficiency of the flyback power converter by recycling the leakage inductance's energy of the transformer in the light load, and achieving the soft switching for the heavy load. Therefore, the flyback power converter can be operated in higher switching frequency for reducing the size of the transformer. The related prior arts can be found in "Clamped Continuous Flyback Power Converter", U.S. Pat. No. 5,570,278; "Offset Resonance Zero Voltage Switching Flyback Converter" U.S. Pat. No. 6,069,803; and "Active-clamp circuit for quasi-resonant flyback power converter", U.S. patent application 20110305048.

BRIEF SUMMARY OF THE INVENTION

It is an objective of the present invention to provide a control circuit for the flyback power converter. It can make the flyback power converter achieve high efficiency in the heavy load and the light load.

It is an objective of the present invention to provide a control circuit for the flyback power converter. It can make the flyback power converter operate at higher switching frequency for reducing the size of its transformer.

The control circuit of the flyback power converter according to the present invention comprises a low-side transistor coupled to switch a transformer. An active-clamper is coupled in parallel with the transformer. A high-side drive circuit is coupled to drive the active-clamper. A controller generates a switching signal and an active-clamp signal. The switching signal is coupled to drive the low-side transistor. The switching signal is generated in accordance with a feedback signal for regulating an output of the flyback power converter. The active-clamp signal is coupled to control the high-side drive circuit and the active-clamper. The active-clamp signal is generated in response to a demagnetizing time of the transformer. Further, the pulse number of the active-clamp signal is less than the pulse number of the switching signal in a light load condition.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

FIG. 6B shows the waveforms of the pulse generator in accordance with the present invention.

FIG. 7B shows the waveforms of the delay circuit in accordance with the present invention.

FIG. 12A shows the waveforms of the switching signal $S_1$, the active-clamp signal $S_2$, and the reflected signal $V_S$ operated in CCM according to the present invention.

DETAILED DESCRIPTION OF THE INVENTION

Figure 1:
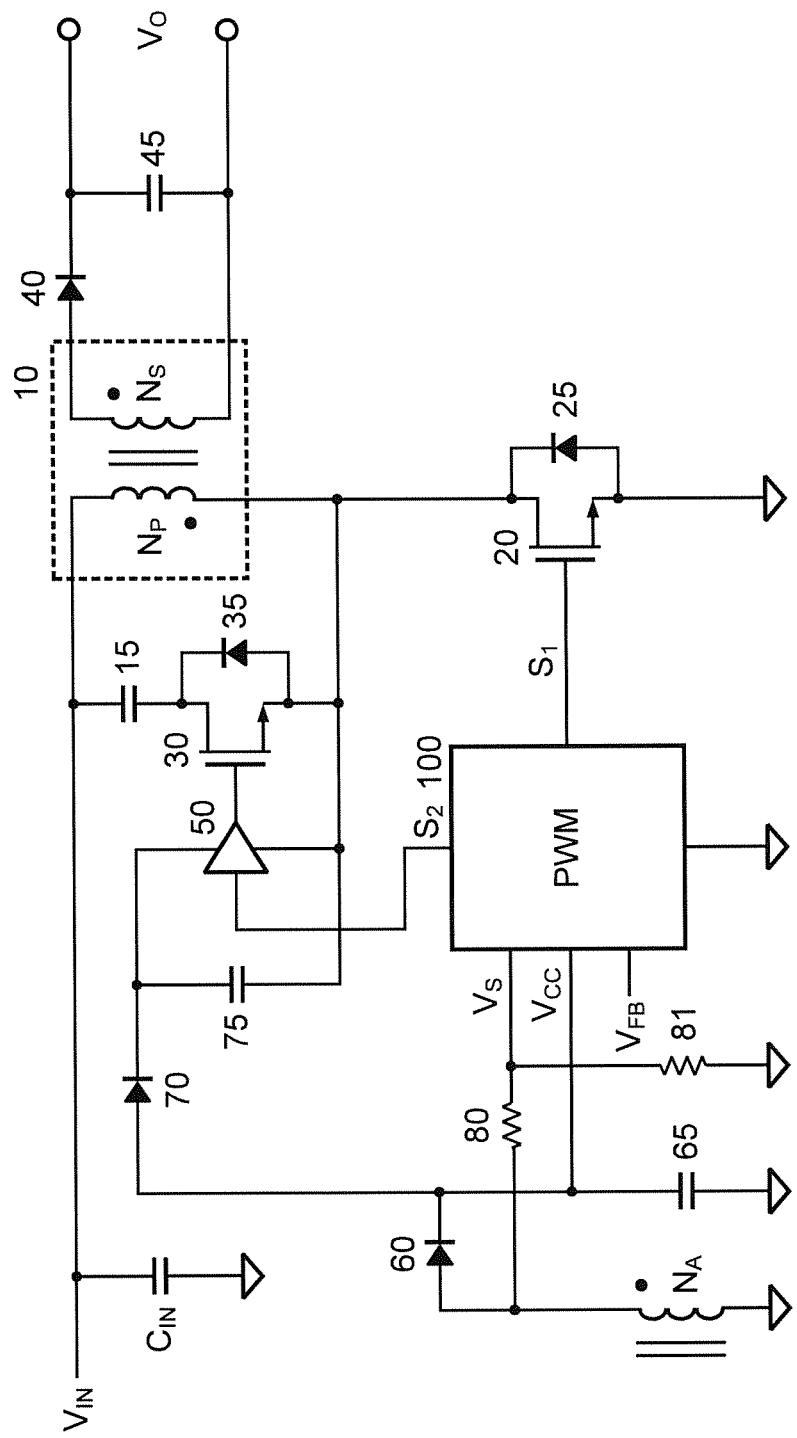
FIG. 1 is a circuit diagram of an embodiment of the power converter in accordance with the present invention.

FIG. 1 is a circuit diagram of an embodiment of the power converter in accordance with the present invention. It is a flyback power converter with active clamp. The power converter includes a transformer 10 having a primary winding $N_P$ and a secondary winding $N_S$. A first terminal of the primary winding $N_P$ is coupled to one terminal of an input capacitor $C_{IN}$ and receives an input voltage $V_{IN}$. The other terminal of the input capacitor $C_{IN}$ is coupled to a ground. The control circuit includes transistors 20, 30, a capacitor 15, a high-side drive circuit 50, and a controller (PWM) 100.

The transistor 20 is coupled between a second terminal of the primary winding $N_P$ and the ground. The transistor 20 is a low-side transistor to switch the primary winding $N_P$ of the transformer 10 for regulating an output $V_O$ of the power converter. A parasitic diode 25 is a body diode that is coupled to the transistor 20 in parallel. The output $V_O$ is generated through a rectifier 40 and an output capacitor 45. The controller 100 generates a switching signal $S_1$ coupled to drive the transistor 20. The switching signal $S_1$ is generated in accordance with a feedback signal $V_{FB}$. The feedback signal $V_{FB}$ is correlated to the output $V_O$ of the power converter.

The transformer 10 further includes an auxiliary winding $N_A$ for generating a power source $V_{CC}$ via a rectifier 60 and a capacitor 65. The power source $V_{CC}$ is connected to supply the power to the controller 100. A first terminal of the rectifier 60 is coupled to a first terminal of the auxiliary winding $N_A$. A second terminal of the auxiliary winding $N_A$ is coupled to the ground. One terminal of the capacitor 65 is coupled to a second terminal of the rectifier 60 and the controller 100. The other terminal of the capacitor 65 is coupled to the ground.

A voltage divider including resistors 80 and 81 is coupled between the auxiliary winding $N_A$ and the ground for generating a reflected signal $V_S$ connected to the controller 100. The reflected signal $V_S$ represents a reflected signal of the transformer 10. The reflected signal of the transformer 10 has the information of the output $V_O$ during the demagnetizing period of the transformer 10. Furthermore, the reflected signal of the transformer 10 includes the information of the demagnetizing time of the transformer 10. The transistor 30 is connected in series with the capacitor 15 to develop an active-clamper. The capacitor 15 is coupled to the first terminal of the primary winding $N_P$, and the transistor 30 is coupled to the second terminal of the primary winding $N_P$. Therefore, the active-clamper is connected in parallel with the primary winding $N_P$ of the transformer 10. The transistor 30 is a high-side transistor. When the transistor 20 is turned off, the energy of the leakage inductance of the transformer 10 will be stored into the capacitor 15 through the transistor 30 and its body diode 35.

The high-side drive circuit 50 is coupled to drive the transistor 30. A charge-pump circuit is coupled to the power source $V_{CC}$ and the high-side drive circuit 50 for providing a voltage source in accordance with the power source $V_{CC}$ to the high-side drive circuit 50. The charge-pump circuit is developed by a diode 70 coupled to the power source $V_{CC}$ and a capacitor 75 connected to the diode 70 in series. The capacitor 75 is further coupled to the high-side drive circuit 50.

The controller 100 generates an active-clamp signal $S_2$ in accordance with the reflected signal $V_S$ for controlling the high-side drive circuit 50 and the transistor 30. Therefore, the active-clamp signal $S_2$ is generated in response to the discharge time (demagnetizing time) of the transformer 10. The active-clamp signal $S_2$ can only be enabled once the switching signal $S_1$ is disabled. The reflected signal $V_S$ is utilized to detect the discharge time of the transformer 10. The pulse width of the active-clamp signal $S_2$ is correlated to the discharge time of the transformer 10. When the transistor 30 is turned on by the active-clamp signal $S_2$, the energy of the leakage inductance of the transformer 10 stored in the capacitor 15 will be delivered to the transformer 10, that recycles the energy of the leakage inductance of the transformer 10.

Figure 2:
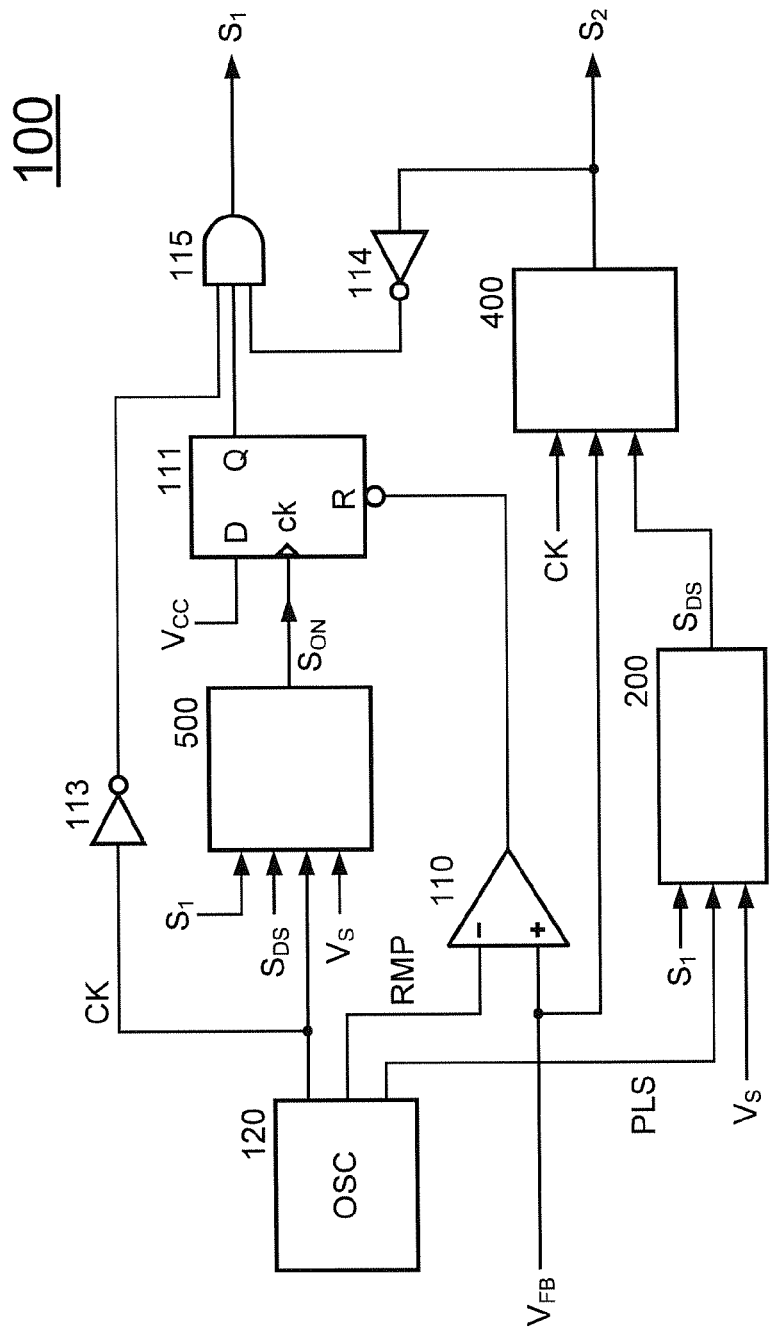
FIG. 2 is a circuit diagram of an embodiment of the controller in accordance with the present invention.

FIG. 2 is a circuit diagram of an embodiment of the controller 100 in accordance with the present invention. It includes an oscillation circuit (OSC) 120 generating a clock signal CK, a ramp signal RMP, and a pulse signal PLS. The clock signal CK or the reflected signal $V_S$ is coupled to disable the switching signal $S_1$ through a turn-on circuit 500, a flip-flop 111, and an AND gate 115. The switching signal $S_1$, a discharge-time signal $S_{DS}$, the clock signal CK, and the reflected signal $V_S$ are coupled to the turn-on circuit 500 for generating a turn-on signal $S_{ON}$ coupled to a clock input terminal ck of the flip-flop 111. The power source $V_{CC}$ is supplied with an input terminal D of the flip-flop 111. The clock signal CK is coupled to a first input terminal of the AND gate 115 via an inverter 113. The active-clamp signal $S_2$ is also coupled to a second input terminal of the AND gate 115 through an inverter 114. Therefore, the switching signal $S_1$ can be enabled once the active-clamp signal $S_2$ is disabled. Furthermore, an output terminal Q of the flip-flop 111 is coupled to a third input terminal of the AND gate 115 for generating the switching signal $S_1$. Therefore, the turn-on signal $S_{ON}$ is utilized to control the switching signal $S_1$.

The ramp signal RMP compares with the feedback signal $V_{FB}$ in a comparator 110. Once the ramp signal RMP is higher than the feedback signal $V_{FB}$, the comparator 110 generates a signal coupled to a reset input terminal R of the flip-flop 111 to disable the switching signal $S_1$ for the pulse width modulation (PWM). The pulse signal PLS, the reflected signal $V_S$, and the switching signal $S_1$ are coupled to a discharge-time signal generation circuit 200 for generating the discharge-time signal $S_{DS}$. The discharge-time signal $S_{DS}$ is related to an accurate demagnetizing time of the transformer 10 shown in FIG. 1. The discharge-time signal $S_{DS}$, the clock signal CK, and the feedback signal $V_{FB}$ are coupled to an active-clamp signal generation circuit 400 for generating the active-clamp signal $S_2$. According to the above, the controller 100 generates the switching signal $S_1$ and the active-clamp signal $S_2$ in response to the demagnetizing time of the transformer 10.

Figure 3:
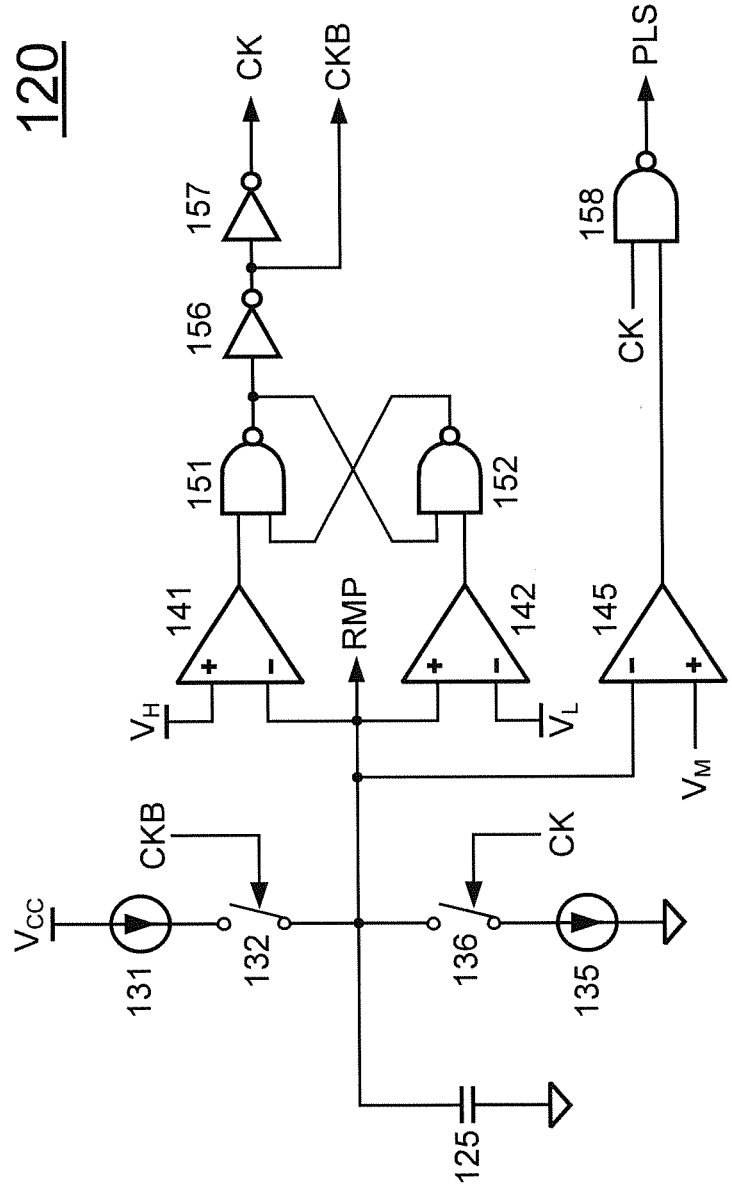
FIG. 3 is a circuit diagram of an embodiment of the oscillation circuit in accordance with the present invention.

FIG. 3 is a circuit diagram of an embodiment of the oscillation circuit 120 in accordance with the present invention. The oscillation circuit 120 includes current sources 131, 135, switches 132, 136, and a capacitor 125 for generating the ramp signal RMP. The current source 131 is coupled between the power source $V_{CC}$ and a first terminal of the switch 132. The capacitor 125 is coupled between a second terminal of the switch 132 and the ground. The current source 135 is coupled between the ground and a second terminal of the switch 136. A first terminal of the switch 136 is coupled to the capacitor 125. Current sources 131 and 135 are utilized to charge and discharge the capacitor 125 through the switches 132 and 136 respectively. The ramp signal RMP is generated in the capacitor 125.

The ramp signal RMP is further coupled to comparators 141, 142, and 145. The ramp signal RMP is coupled to negative input terminals of the comparators 141 and 145. The ramp signal RMP is further coupled to a positive input terminal of the comparator 142. The comparator 141 has a trip-point voltage $V_H$ supplied with a positive input terminal of the comparator 141 to compare with the ramp signal RMP. The comparator 142 has a trip-point voltage $V_L$ supplied with a negative input terminal of the comparator 142 to compare with the ramp signal RMP. The comparator 145 has a threshold voltage $V_M$ supplied with a positive input terminal of the comparator 145 to compare with the ramp signal RMP, in which the voltage level of the voltage is $V_H > V_M > V_L$.

NAND gates 151 and 152 form a latch circuit connected to receive the output signals of the comparators 141 and 142. The latch circuit and inverters 156, 157 are utilized to generate clock signals CK and CKB. The clock signal CK is applied to control the switch 136 for the discharge of the capacitor 125. The clock signal CKB is used for controlling the switch 132 for the charge of the capacitor 125. A first input terminal of the NAND gate 151 is coupled to an output terminal of the comparator 141. A first input terminal of the NAND gate 152 is coupled to an output terminal of the comparator 142. A second input terminal of the NAND gate 151 is coupled to an output terminal of the NAND gate 152. An output terminal of the NAND gate 151 is coupled to a second input terminal of the NAND gate 152. An output signal of the NAND gate 151 is connected to an input terminal of the inverter 156 for generating the clock signal CKB at an output terminal of the inverter 156. The clock signal CKB is further coupled to an input terminal of the inverter 157 for generating the clock signal CK at an output terminal of the inverter 157. An output signal of the comparator 145 and the clock signal CK are utilized to generate the pulse signal PLS through an NAND gate 158. Therefore, the pulse signal PLS is correlated to the clock signal CK.

Figure 4:
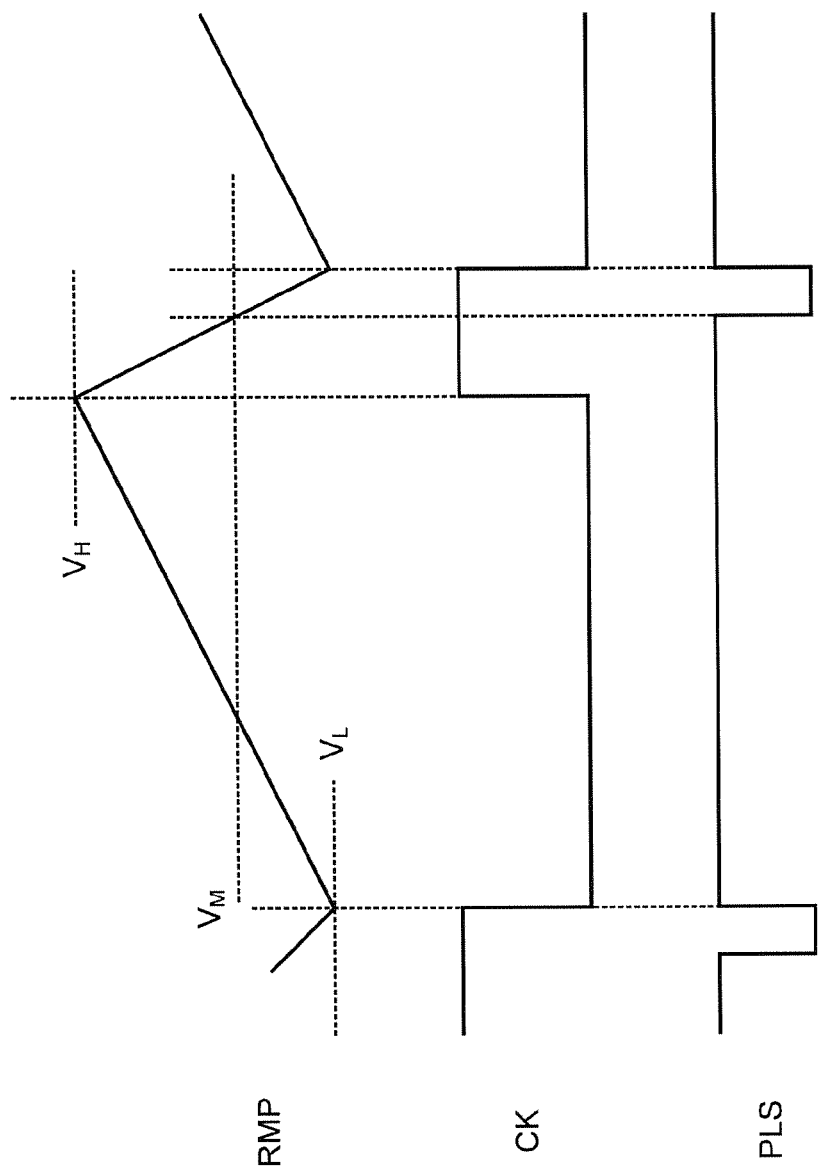
FIG. 4 shows the waveforms of the ramp signal RMP, the clock signal CK, and the pulse signal PLS of the oscillation circuit in accordance with the present invention.

FIG. 4 shows the waveforms of the ramp signal RMP, the clock signal CK, and the pulse signal PLS of the oscillation circuit 120 in accordance with the present invention. The clock signal CK is enabled (logic high) when the ramp signal RMP is higher than the trip-point voltage $V_H$. Once the ramp signal RMP is lower than the trip-point voltage $V_L$, the clock signal CK is disabled (logic low). The pulse signal PLS is enabled (logic high) when the clock signal CK is disabled. Once the clock signal CK is enabled and the ramp signal RMP is lower than the threshold voltage $V_M$, the pulse signal PLS is disabled.

Figure 5:
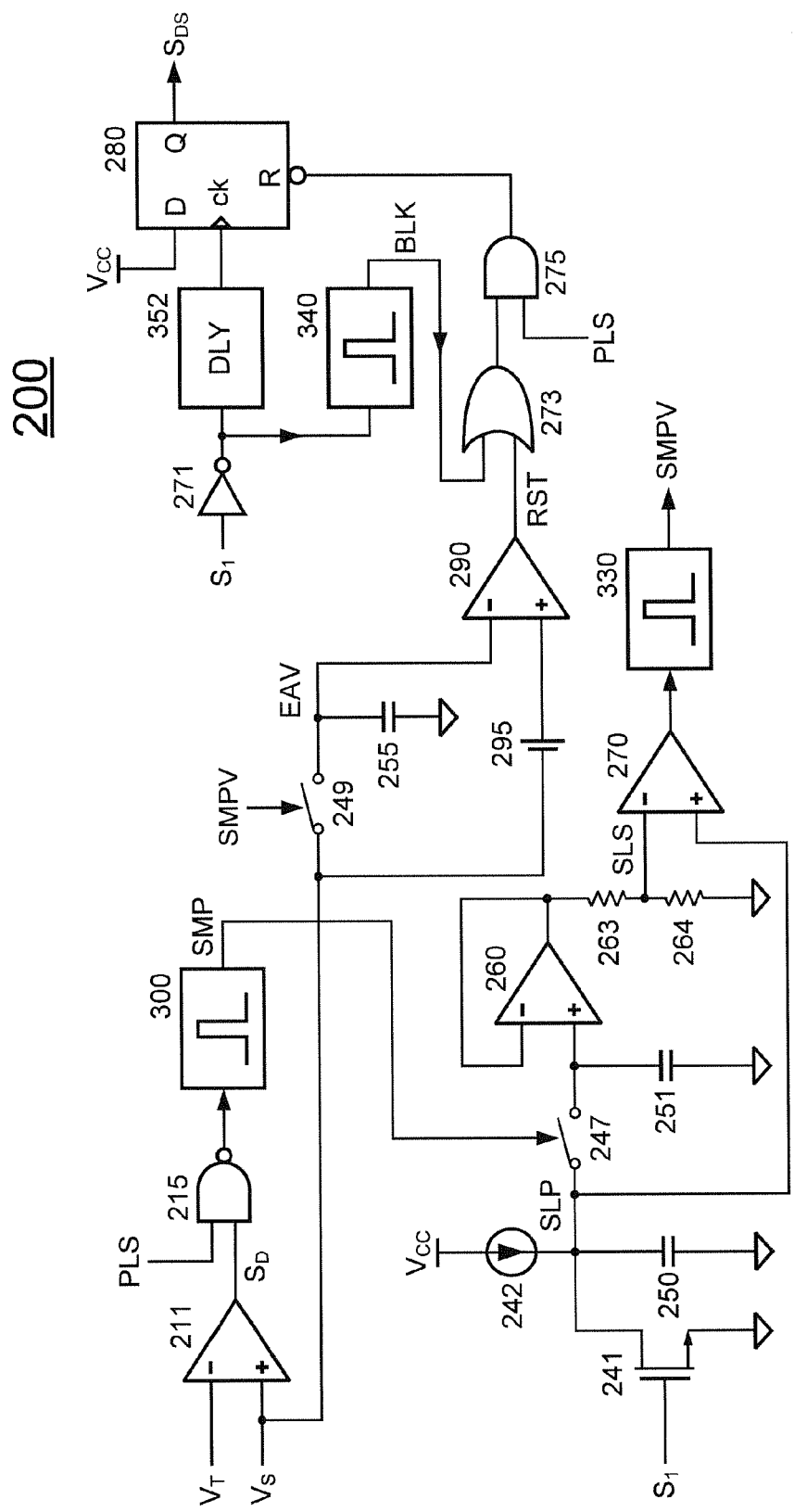
FIG. 5 is a circuit diagram of an embodiment of the discharge-time signal generation circuit in accordance with the present invention.

FIG. 5 is a circuit diagram of an embodiment of the discharge-time signal generation circuit 200 in accordance with the present invention. A current source 242 is coupled from the power source $V_{CC}$ to a first terminal of a capacitor 250. A second terminal of the capacitor 250 is coupled to the ground. A drain of a transistor 241 is coupled to the first terminal of the capacitor 250. A source of the transistor 241 is coupled to the ground. The switching signal $S_1$ is coupled to a gate of the transistor 241. The capacitor 250 will be charged by the current source 242 and generate a slope signal SLP once the switching signal $S_1$ is disabled (logic low). The capacitor 250 will be discharged via the transistor 241 when the switching signal $S_1$ is enabled (logic high).

The reflected signal $V_S$ and a threshold $V_T$ are respectively supplied with a positive input terminal and a negative input terminal of a comparator 211. The comparator 211 will generate a demagnetized-time signal $S_D$ (logic low) when the reflected signal $V_S$ is lower than the threshold $V_T$. The demagnetized-time signal $S_D$ represents a rough demagnetizing time of the transformer 10 (as shown in FIG. 1) when the power converter is operated in DCM (discontinuous current mode). The demagnetized-time signal $S_D$ is coupled to a first input terminal of an NAND gate 215. The pulse signal PLS is coupled to a second input terminal of the NAND gate 215. An output signal of the NAND gate 215 is coupled to an input terminal of a pulse generator 300. Through the NAND gate 215 and the pulse generator 300, the demagnetized-time signal $S_D$ and the pulse signal PLS are coupled to generate a sample signal SMP to control a switch 247 for sampling the slope signal SLP of the capacitor 250 to a capacitor 251. The switch 247 is coupled between the capacitor 250 and the capacitor 251. The signal level of the signal of the capacitor 251 is correlated to the period of the discharge (demagnetizing) time of the transformer 10.

The pulse signal PLS is utilized to control the discharge-time signal $S_{DS}$ when the power converter is operated in CCM (continuous current mode). The CCM operation means that the transformer 10 is not fully demagnetized before the start of the next switching cycle. Therefore, the pulse signal PLS is utilized to generate the sample signal SMP before the switching signal $S_1$ is enabled.

The switching signal $S_1$ is coupled to an input terminal of an inverter 271. An output terminal of the inverter 271 is coupled to an input terminal of a delay circuit (DLY) 352. An output terminal of the delay circuit 352 is coupled to a clock input terminal ck of a flip-flop 280. The power source $V_{CC}$ is supplied with an input terminal D of the flip-flop 280. An output terminal Q of the flip-flop 280 outputs the discharge-time signal $S_{DS}$. The switching signal $S_1$ is coupled to generate the discharge-time signal $S_{DS}$ via the inverter 271, the delay circuit 352, and the flip-flop 280. Therefore, when the switching signal $S_1$ is disabled, the discharge-time signal $S_{DS}$ will be enabled after a time delay $T_B$ shown in FIG. 7B.

A positive input terminal of a buffer amplifier 260 is coupled to receive the voltage across the capacitor 251. A negative input terminal of the buffer amplifier 260 is coupled to an output terminal of the buffer amplifier 260. A voltage divider developed by resistors 263 and 264 is coupled between the output terminal of the buffer amplifier 260 and the ground. The voltage across the capacitor 251 is coupled to generate a level-shift signal SLS through the buffer amplifier 260 and the resistors 263, 264. The level-shift signal SLS is coupled to a negative input terminal of a comparator 270. The slope signal SLP is coupled to a positive input terminal of the comparator 270. An output signal of the comparator 270 is coupled to a pulse generator 330. The level-shift signal SLS compares with the slope signal SLP to generate a sample signal SMPV via the pulse generator 330 before the end of the demagnetizing time of the transformer 10.

The reflected signal $V_S$ is further coupled to a first terminal of a switch 249. A second terminal of the switch 249 is coupled to a capacitor 255. The switch 249 is controlled by the sample signal SMPV. The sample signal SMPV is coupled to sample the value of the reflected signal $V_S$ into the capacitor 255 through the switch 249. The capacitor 255 will thus generate a voltage signal EAV correlated to the level of the reflected signal $V_S$. The voltage signal EAV is connected to a negative input terminal of a comparator 290. A positive input terminal of the comparator 290 is coupled to receive the reflected signal $V_S$ through an offset voltage 295. Thus, the comparator 290 will generate a reset signal RST (logic low) once the level of the reflected signal $V_S$ is lower than the level of the voltage signal EAV.

The reset signal RST is coupled to a first input terminal of an OR gate 273. An output terminal of the OR gate 273 is coupled to a first input terminal of an AND gate 275. The pulse signal PLS is coupled to a second input terminal of the AND gate 275. An output terminal of the AND gate 275 is coupled to a reset input terminal R of the flip-flop 280 to reset the flip-flop 280. Therefore, the reset signal RST and the pulse signal PLS are coupled to disable the flip-flop 280 via the AND gate 275 and the OR gate 273 for disabling the discharge-time signal $S_{DS}$.

The switching signal $S_1$ is coupled to a pulse generator 340 via the inverter 271. Through the inverter 271 and the pulse generator 340, a blank signal BLK will be generated in response to the disable of the switching signal $S_1$ to inhibit the reset signal RST resetting the flip-flop 280. The blank signal BLK is coupled to a second input terminal of the OR gate 273. The pulse width of the blank signal BLK is utilized to produce a minimum on-time of the discharge-time signal $S_{DS}$. The flip-flop 280 generates the discharge-time signal $S_{DS}$ that is related to the accurate demagnetizing time of the transformer 10.

The detail skill of generating the discharge (demagnetizing) time signal can be found in the prior arts of "Causal sampling circuit for measuring reflected voltage and demagnetizing time of transformer", U.S. Pat. No. 7,349,229; "Method and apparatus for detecting demagnetizing time of magnetic device", U.S. Pat. No. 7,471,523.

Figure 6A:
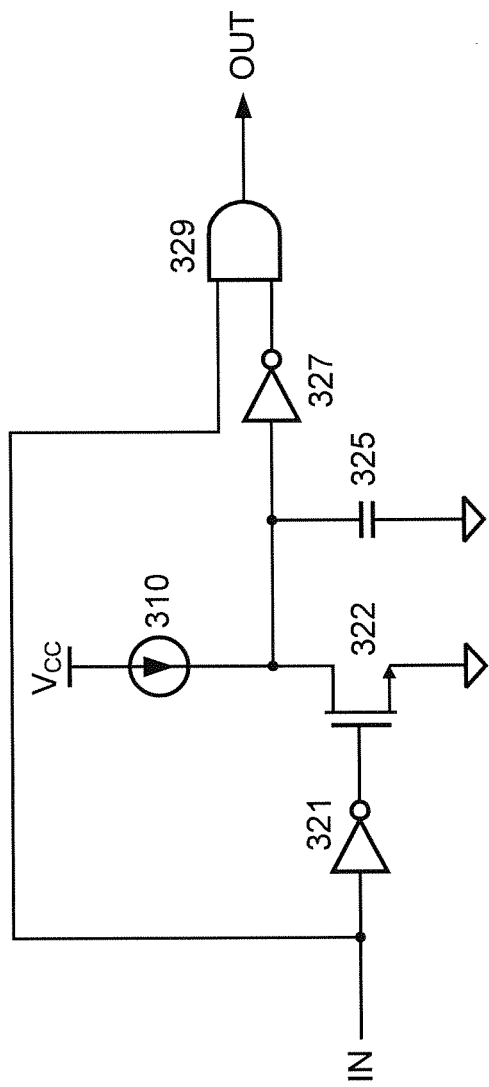
FIG. 6A shows a reference circuit schematic of the pulse generator in accordance with the present invention.

FIG. 6A and FIG. 6B show a reference circuit schematic and the waveforms of the pulse generators 300, 330, and 340 in accordance with the present invention. The pulse generator comprises a current source 310, a transistor 322, a capacitor 325, inverters 321, 327, and an AND gate 329. The current source 310 is coupled from the power source $V_{CC}$ to a first terminal of the capacitor 325. A second terminal of the capacitor 325 is coupled to the ground. The current source 310 is used to charge the capacitor 325. A drain of the transistor 322 is coupled to the first terminal of the capacitor 325.

A source of the transistor 322 is coupled to the ground. An input signal IN, such as output signals of the NAND gate 215, the comparator 270, and the inverter 271 shown in FIG. 5, is coupled to a gate of the transistor 322 through the inverter 321 to control the transistor 322. The input signal IN is further coupled to a first input terminal of the AND gate 329. A second input terminal of the AND gate 329 is coupled to the capacitor 325 through the inverter 327. An output terminal of the AND gate 329 generates an output signal OUT, such as the sample signals SMP, SMPV, and the blank signal BLK shown in FIG. 5. The output signal OUT is a pulse signal.

Once the input signal IN is enabled, the transistor 322 is turned off and the current source 310 charges the capacitor 325 for generating the output signal OUT. The pulse width $T_P$ of the output signal OUT shown in FIG. 6B is determined by the current of the current source 310 and the capacitance of the capacitor 325. The transistor 322 is coupled to discharge the capacitor 325 when the input signal IN is disabled and the transistor 322 is turned on.

Figure 7A:
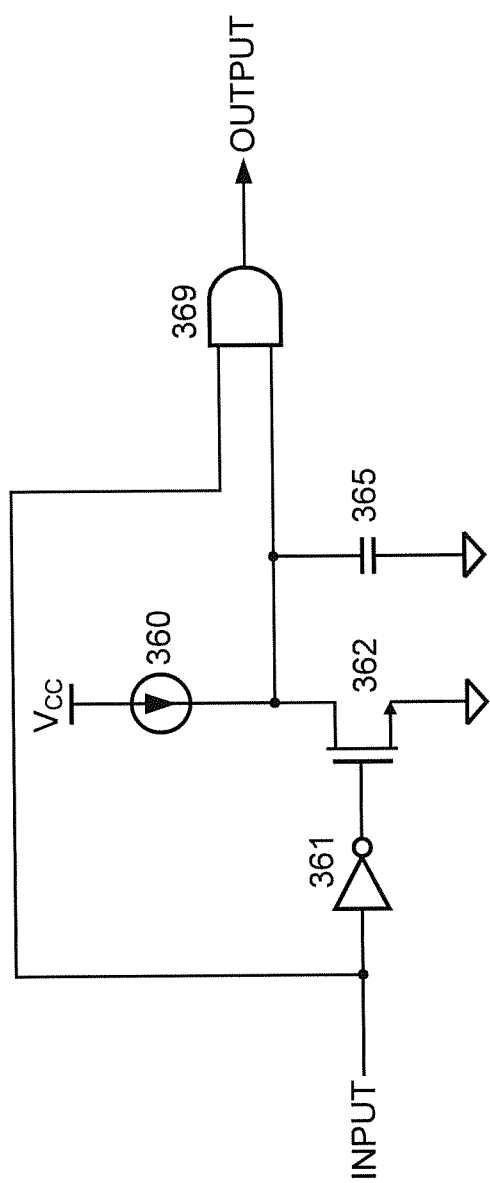
FIG. 7A shows a reference circuit schematic of the delay circuit in accordance with the present invention.

FIG. 7A and FIG. 7B show a reference circuit schematic and the waveforms of the delay circuit 352 in accordance with the present invention. The delay circuit 352 comprises a current source 360, a transistor 362, a capacitor 365, an inverter 361, and an AND gate 369. The current source 360 is coupled from the power source $V_{CC}$ to a first terminal of the capacitor 365. A second terminal of the capacitor 365 is coupled to the ground. The current source 360 is used to charge the capacitor 365. A drain of the transistor 362 is coupled to the first terminal of the capacitor 365. A source of the transistor 362 is coupled to the ground. An input signal INPUT, that is the inverse switching signal $S_1$ shown in FIG. 5, is coupled to a gate of the transistor 362 through the inverter 361 to control the transistor 362. The input signal INPUT is further coupled to a first input terminal of the AND gate 369. A second input terminal of the AND gate 369 is coupled to the capacitor 365. An output terminal of the AND gate 369 generates an output signal OUTPUT.

Once the input signal INPUT is enabled, the transistor 362 is turned off and the current source 360 charges the capacitor 365 for generating the output signal OUTPUT after the time delay $T_B$ (as shown in FIG. 7B). The time delay $T_B$ is determined by the current of the current source 360 and the capacitance of the capacitor 365. The transistor 362 is coupled to discharge the capacitor 365 when the input signal INPUT is disabled and the transistor 362 is turned on.

Figure 8:
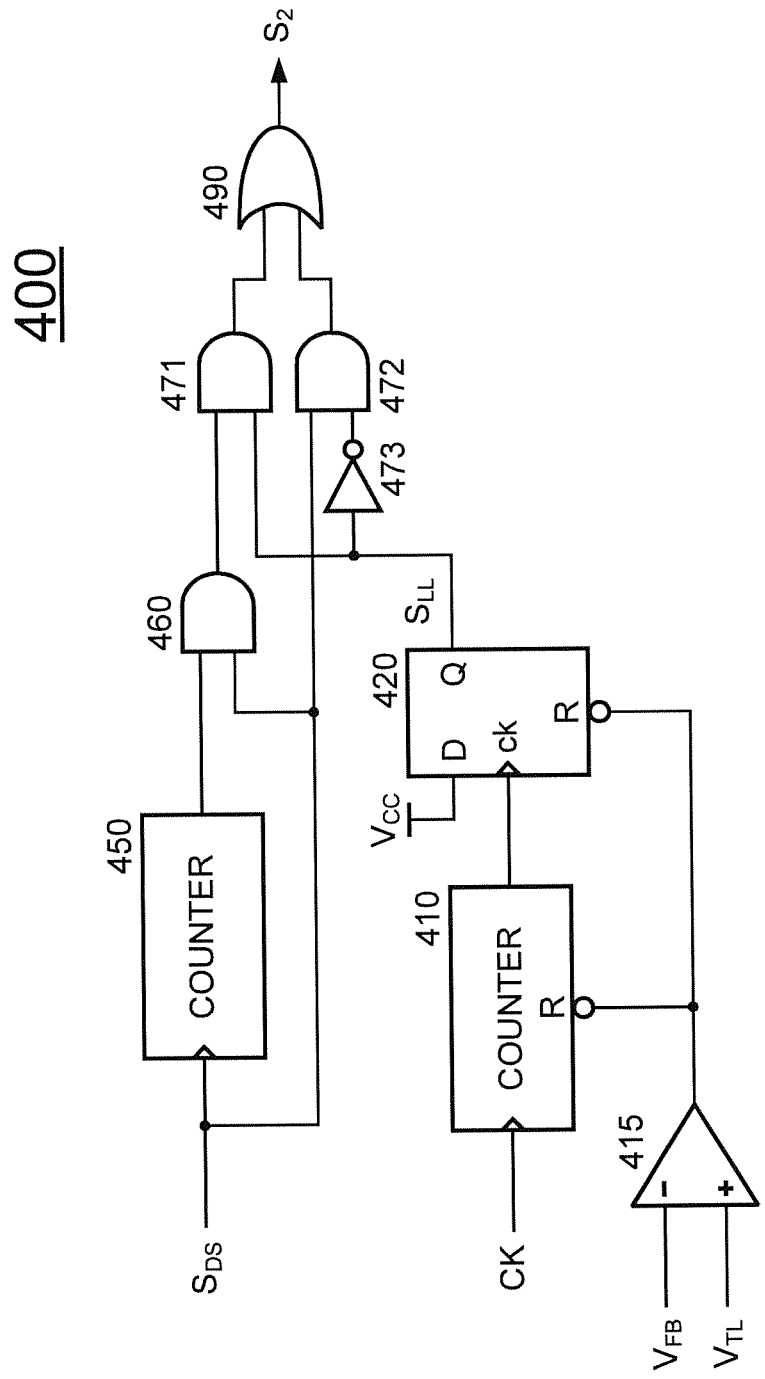
FIG. 8 is a circuit diagram of an embodiment of the active-clamp signal generation circuit in accordance with the present invention.

FIG. 8 is a circuit diagram of an embodiment of the active-clamp signal generation circuit 400 in accordance with the present invention. The active-clamp signal $S_2$ is generated in accordance with the discharge-time signal $S_{DS}$. As shown in FIG. 5, because the discharge-time signal $S_{DS}$ is enabled (logic high) after the time delay $T_B$ shown in FIG. 7B when the switching signal $S_1$ is disabled (logic low), the active-clamp signal $S_2$ is enabled (logic high) after a time delay $T_D$ (as shown in FIG. 12A) when the switching signal $S_1$ is disabled.

An OR gate 490, AND gates 471, 472, and an inverter 473 develop a multiplexer to generate the active-clamp signal $S_2$. Output terminals of the AND gates 471 and 472 are coupled to input terminals of the OR gate 490 to generate the active-clamp signal $S_2$. The discharge-time signal $S_{DS}$ is coupled to a first input terminal of the multiplexer (a first input terminal of the AND gate 472). The discharge-time signal $S_{DS}$ is coupled to a second input terminal of the multiplexer (a first input terminal of the AND gate 471) through a counter 450 and an AND gate 460. The counter 450 operates as a divider to the discharge-time signal $S_{DS}$. The divided discharge-time signal $S_{DS}$ is coupled to an input terminal of the AND gate 460.

The feedback signal $V_{FB}$ is coupled to a negative input terminal of a comparator 415. A light-load threshold $V_{TL}$ is supplied with a positive input terminal of the comparator 415. An output terminal of the comparator 415 is coupled to reset input terminals R of a counter 410 and a flip-flop 420. The comparator 415 is utilized to generate a selection signal $S_{LL}$ when the level of the feedback signal $V_{FB}$ is lower than the level of the light-load threshold $V_{TL}$. The clock signal CK is coupled to an input terminal of the counter 410. An output terminal of the counter 410 is coupled to a clock input terminal ck of the flip-flop 420. The power source $V_{CC}$ is supplied with an input terminal D of the flip-flop 420.

Figure 9:
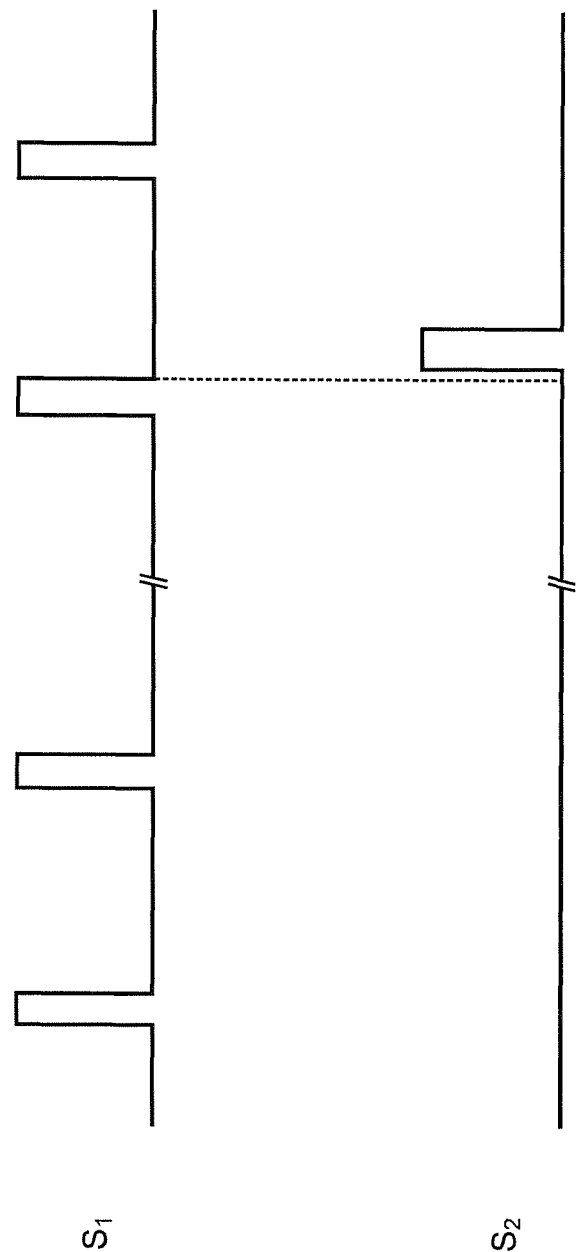
FIG. 9 shows the waveforms of the switching signal $S_1$ and the active-clamp signal $S_2$ in the light load condition.

The counter 410 and the flip-flop 420 provide a time delay for generating the selection signal $S_{LL}$. The selection signal $S_{LL}$ is coupled to the multiplexer (second input terminals of the AND gates 471 and 472) for the signal selection. For a normal condition, the level of the selection signal $S_{LL}$ is the logic low, and therefore the active-clamp signal $S_2$ is generated in accordance with the discharge-time signal $S_{DS}$. During a light load condition, the feedback signal $V_{FB}$ is lower than the light-load threshold $V_{TL}$, the level of the selection signal $S_{LL}$ is the logic high, and therefore the active-clamp signal $S_2$ is generated in response to the divided discharge-time signal $S_{DS}$. Therefore, the pulse number of the active-clamp signal $S_2$ is less than the pulse number of the discharge-time signal $S_{DS}$ in the light load condition. It means that the pulse number of the active-clamp signal $S_2$ is less than the pulse number of the switching signal $S_1$ in the light load condition, as shown in FIG. 9.

Figure 10:
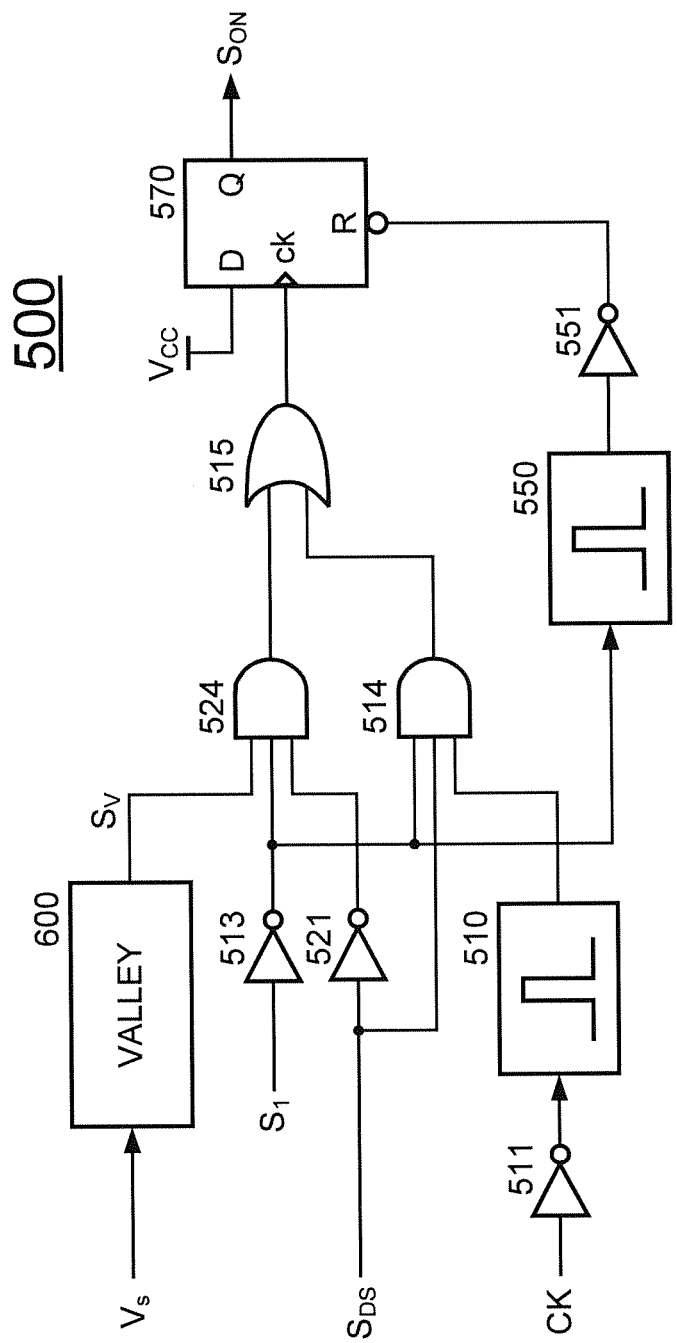
FIG. 10 is a circuit diagram of an embodiment of the turn-on circuit in accordance with the present invention.

FIG. 10 is a circuit diagram of an embodiment of the turn-on circuit 500 in accordance with the present invention. The power source $V_{CC}$ is supplied with an input terminal D of a flip-flop 570. The flip-flop 570 is utilized to generate the turn-on signal $S_{ON}$ at an output terminal Q of the flip-flop 570. The switching signal $S_1$ is coupled to an input terminal of a pulse generator 550 via an inverter 513 to generate a pulse signal. The pulse signal is coupled to a reset input terminal R of the flip-flop 570 via an inverter 551. Thus, the flip-flop 570 is cleared in response to the disable of the switching signal $S_1$ via the inverters 513, 551 and the pulse generator 550. The circuit of the pulse generator 550 is the same as the circuit of the pulse generator shown in FIG. 6A.

The clock signal CK is coupled to an input terminal of a pulse generator 510 via an inverter 511 to generate a pulse signal. The circuit of the pulse generator 510 is the same as the circuit of the pulse generator shown in FIG. 6A. The pulse signal is coupled to a clock input terminal ck of the flip-flop 570 via an AND gate 514 and an OR gate 515. The pulse signal generated by the pulse generator 510 is coupled to a first input terminal of the AND gate 514. An output terminal of the AND gate 514 is coupled to a first input terminal of the OR gate 515. An output terminal of the OR gate 515 is coupled to the clock input terminal ck of the flip-flop 570. The turn-on signal $S_{ON}$ is enabled in response to the clock signal CK in the CCM operation. The clock signal CK enables the turn-on signal $S_{ON}$ via the inverter 511, the pulse generator 510, the AND gate 514, the OR gate 515, and the flip-flop 570. As shown in FIG. 2, the switching signal $S_1$ is enabled in response to the turn-on signal $S_{ON}$, and the turn-on signal $S_{ON}$ is enabled in response to the clock signal CK in the CCM operation. Thus, the switching signal $S_1$ is enabled in response to the clock signal CK in the CCM operation.

The discharge-time signal $S_{DS}$ is coupled to a second input terminal of the AND gate 514. The enable of the discharge-time signal $S_{DS}$ will enable the AND gate 514 for CCM operation. The switching signal $S_1$ is further coupled to a third input terminal of the AND gate 514 via the inverter 513.

The discharge-time signal $S_{DS}$ is coupled to a first input terminal of an AND gate 524 via an inverter 521. The switching signal $S_1$ is further coupled to a second input terminal of the AND gate 524 via the inverter 513. An output terminal of the AND gate 524 is coupled to a second input terminal of the OR gate 515. Once the transformer 10 (as shown in FIG. 1) is demagnetized, the discharge-time signal $S_{DS}$ is disabled, and the turn-on signal $S_{ON}$ will be enabled in response to the reflected signal $V_S$. The reflected signal $V_S$ is utilized to generate a valley-voltage signal $S_V$ through a valley-signal generation circuit (VALLEY) 600. The valley-voltage signal $S_V$ is coupled to a third input terminal of the AND gate 524. The valley-voltage signal $S_V$ enables the turn-on signal $S_{ON}$ via the AND gate 524, the OR gate 515, and the flip-flop 570. The zero voltage switching (ZVS) and/or the soft switching can be achieved in the heavy load condition when the switching signal $S_1$ turns on the transistor 20 (as shown in FIG. 1) in response to the valley-voltage signal $S_V$. The valley-voltage signal $S_V$ represents a valley voltage of the reflected signal $V_S$.

The detail skill of the valley voltage switching can be found in the prior arts of "Switching control circuit having a valley voltage detector to achieve soft switching for a resonant power converter", U.S. Pat. No. 7,426,120; "Control circuit having off-time modulation to operate power converter at quasi-resonance and in continuous current mode", U.S. Pat. No. 8,094,468; "Control circuit with burst mode and extended valley switching for quasi-resonant power converter", U.S. patent application 20120069608; "Controller with valley switching and limited maximum frequency for quasi-resonant power converters", U.S. patent application 20120081084.

Figure 11:
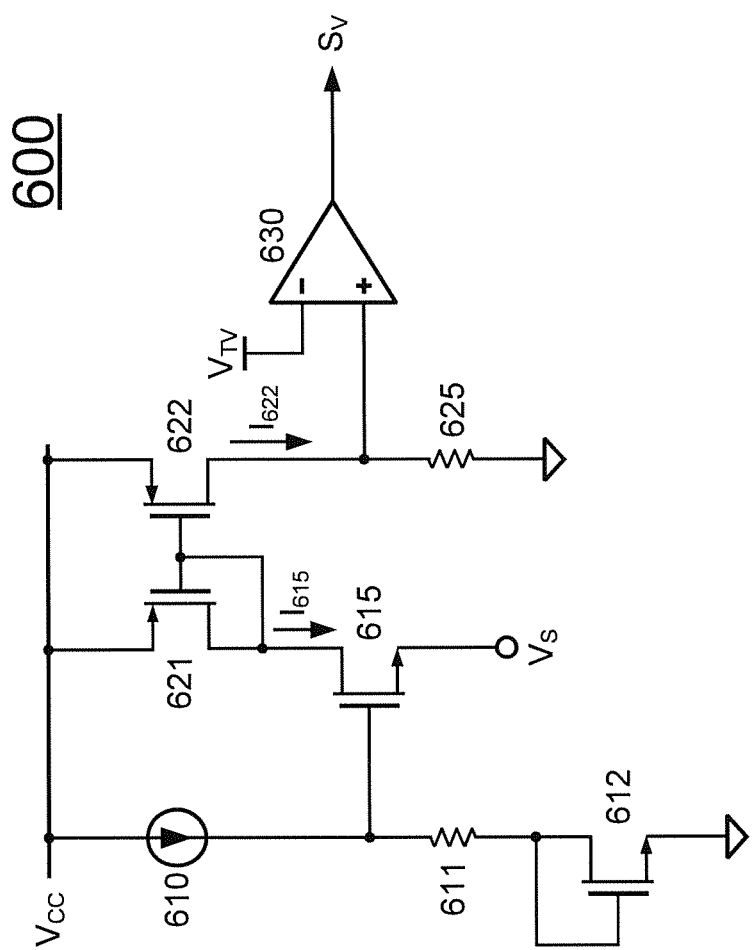
FIG. 11 is a circuit diagram of an embodiment of the valley-signal generation circuit in accordance with the present invention.

FIG. 11 is a circuit diagram of an embodiment of the valley-signal generation circuit 600 in accordance with the present invention. A current source 610 is connected between the power source $V_{CC}$ and a gate of a transistor 615. A resistor 611 is connected between the gate of the transistor 615 and a drain of a transistor 612. A gate and the drain of the transistor 612 are connected together. A source of the transistor 612 is connected to the ground. The current source 610, the resistor 611, and the transistor 612 provide a bias voltage to the transistor 615. A source of the transistor 615 is coupled to receive the reflected signal $V_S$ for generating a current $I_{615}$ coupled to mirror transistors 621 and 622.

Sources of the transistors 621 and 622 are coupled to the power source $V_{CC}$. Gates of the transistors 621, 622 and drains of the transistors 615, 621 are coupled together. In response to the current $I_{615}$, a drain of the transistor 622 generates a current $I_{622}$ coupled to generate a voltage on a resistor 625. The resistor 625 is coupled from the drain of the transistor 622 to the ground. A positive input terminal of a comparator 630 receives the voltage of the resistor 625. A threshold $V_{TV}$ is supplied with a negative input terminal of the comparator 630. The valley-voltage signal $S_V$ is generated by the comparator 630 when the voltage of the resistor 625 is higher than the threshold $V_{TV}$.

FIG. 12A shows the waveforms of the switching signal $S_1$, the active-clamp signal $S_2$, and the reflected signal $V_S$ operated in CCM according to the present invention. When the switching signal $S_1$ is disabled, the active-clamp signal $S_2$ will be enabled after the time delay $T_D$. The period of the time delay $T_D$ is determined by the delay circuit 352 shown in FIG. 5. The pulse width of the active-clamp signal $S_2$ is related to the period of the discharge time $T_{DS}$. The active-clamp signal $S_2$ will be disabled before the switching signal $S_1$ is enabled. A dead time $T_X$ is determined by the pulse width of the pulse signal PLS shown in FIG. 2.

Figure 12B:
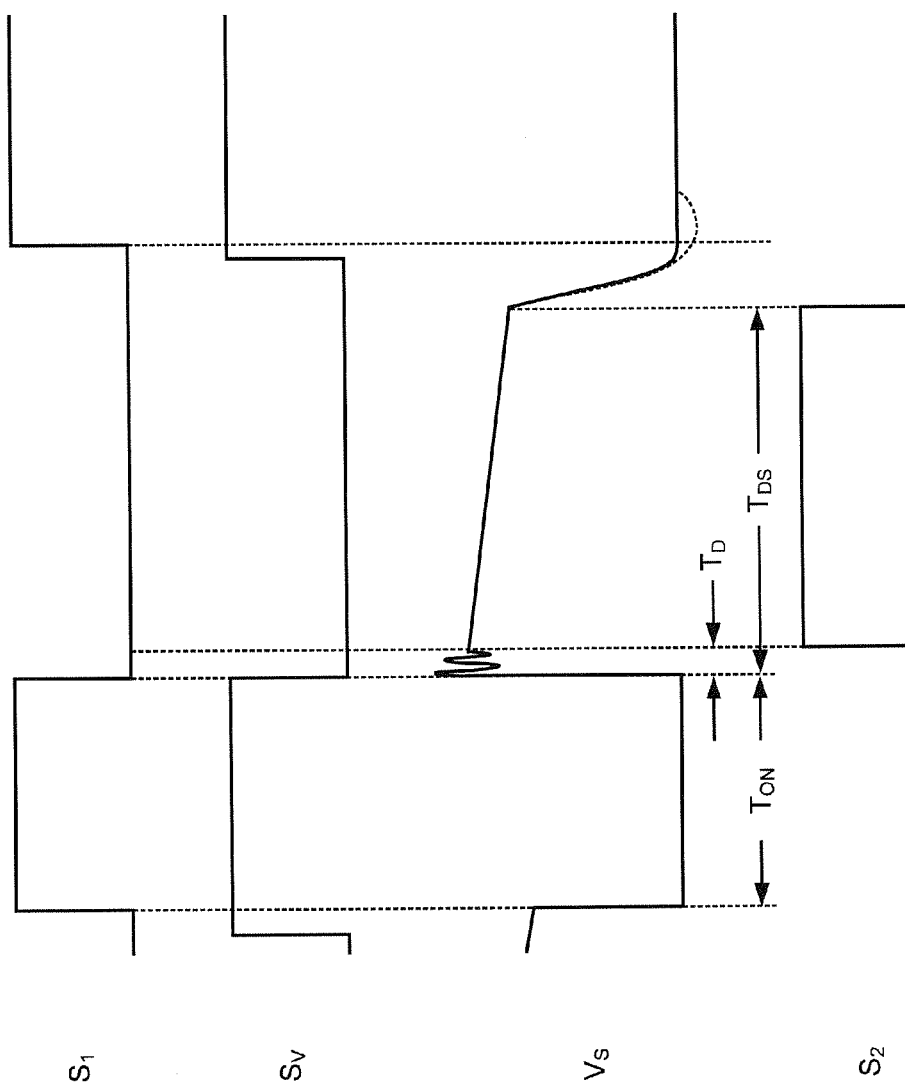
FIG. 12B shows the waveforms of the switching signal $S_1$, the valley-voltage signal $S_V$, the reflected signal $V_S$, and the active-clamp signal $S_2$ according to the present invention.

FIG. 12B shows the waveforms of the switching signal $S_1$, the valley-voltage signal $S_V$, the reflected signal $V_S$, and the active-clamp signal $S_2$ according to the present invention. The waveform of the voltage of the transistor 20 (as shown in FIG. 1) is correlated to the waveform of the reflected signal $V_S$. The switching signal $S_1$ is enabled in response to the valley voltage of the reflected signal $V_S$, which will achieve the soft switching to the transistor 20 in the heavy load condition. The efficiency of the power converter is thus improved by reducing the switching loss of the transistor 20.

Figure 12C:
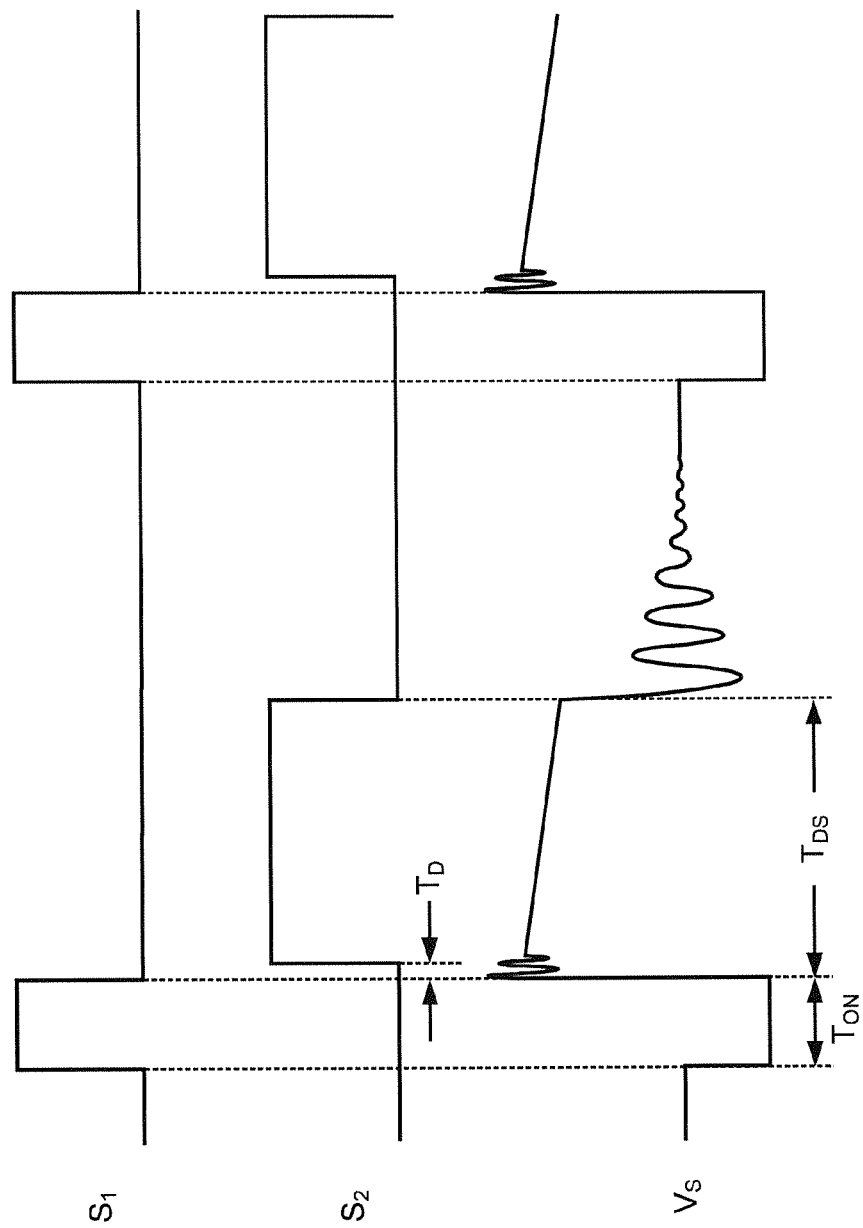
FIG. 12C shows the waveforms of the switching signal $S_1$, the active-clamp signal $S_2$, and the reflected signal $V_S$ operated in the light load condition according to the present invention.

FIG. 12C shows the waveforms of the switching signal $S_1$, the active-clamp signal $S_2$, and the reflected signal $V_S$ operated in the light load condition according to the present invention. The discharge (demagnetizing) time $T_{DS}$ of the transformer 10 (as shown in FIG. 1) determines the pulse width of the active-clamp signal $S_2$. The active-clamp signal $S_2$ will be disabled before the enable of the switching signal $S_1$ for CCM and DCM operations. The efficiency of the power converter is improved by recycling the leakage inductance's energy of the transformer 10 to the output of the power converter.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A control circuit of a flyback power converter, comprising:
   a low-side transistor coupled to switch a transformer;
   an active-clamper coupled in parallel with the transformer;
   a high-side drive circuit coupled to drive the active-clamper; and
   a controller generating a switching signal and an active-clamp signal;
   wherein the switching signal is coupled to drive the low-side transistor; the switching signal is generated in accordance with a feedback signal for regulating an output of the flyback power converter; the active-clamp signal is coupled to control the high-side drive circuit and the active-clamper; the active-clamp signal is generated in response to a demagnetizing time of the transformer; the pulse number of the active-clamp signal is less than the pulse number of the switching signal in a light load condition.

2. The control circuit as claimed in claim 1, wherein the active-clamper comprises a high-side transistor connected in series with a capacitor, the high-side drive circuit is coupled to drive the high-side transistor.

3. The control circuit as claimed in claim 1, wherein the active-clamp signal is generated in accordance with a reflected signal of the transformer.

4. The control circuit as claimed in claim 1, wherein the pulse width of the active-clamp signal is correlated to the demagnetizing time of the transformer.

5. The control circuit as claimed in claim 1, wherein the controller generates the switching signal in response to the demagnetizing time of the transformer.

6. The control circuit as claimed in claim 1, wherein the controller includes:
- a discharge-time signal generation circuit generating a discharge-time signal in response to a reflected signal of the transformer; in which the discharge-time signal is related to the demagnetizing time of the transformer;
- a turn-on circuit generating a turn-on signal in response to the discharge-time signal for generating the switching signal; and
- an active-clamp signal generation circuit generating the active-clamp signal in response to the discharge-time signal.

7. The control circuit as claimed in claim 1, wherein the switching signal is enabled in response to a clock signal in a CCM operation; the clock signal is generated by an oscillation circuit of the controller.

8. The control circuit as claimed in claim 1, wherein the active-clamp signal is disabled in response to a pulse signal in a CCM operation; the pulse signal is generated by an oscillation circuit of the controller; the pulse signal is correlated to a clock signal generated by the oscillation circuit.

9. A method for controlling a flyback power converter with an active-clamper, comprising:
- generating a switching signal in accordance with a feedback signal for switching a low-side transistor and regulating an output of the flyback power converter; and
- generating an active-clamp signal in accordance with a demagnetizing time of a transformer;
- wherein the pulse number of the active-clamp signal is less than the pulse number of the switching signal in a light load condition; the low-side transistor is coupled to switch the transformer; the active-clamp signal is coupled to drive the active-clamper, the active-clamper is coupled in parallel with the transformer.

10. The method as claimed in claim 9, wherein the active-clamp signal is generated in accordance with a reflected signal of the transformer.

11. The method as claimed in claim 9, wherein the switching signal is generated in response to the demagnetizing time of the transformer.

12. The method as claimed in claim 9, wherein the switching signal is enabled in response to a clock signal in a CCM operation; the clock signal is generated by an oscillation circuit.

13. The method as claimed in claim 9, wherein the active-clamp signal is disabled in response to a pulse signal in a CCM operation; the pulse signal is correlated to a clock signal.

14. A control circuit of an active clamp flyback power converter, comprising:
- a low-side transistor coupled to switch a transformer;
- an active-clamper coupled in parallel with the transformer;
- a high-side drive circuit coupled to drive the active-clamper; and
- a controller generating a switching signal and an active-clamp signal;
- wherein the switching signal is coupled to drive the low-side transistor; the switching signal is generated in accordance with a feedback signal for regulating an output of the active clamp flyback power converter; the active-clamp signal is coupled to control the high-side drive circuit and the active-clamper; the pulse number of the active-clamp signal is less than the pulse number of the switching signal in a light load condition.

15. The control circuit as claimed in claim 14, wherein the pulse width of the active-clamp signal is correlated to a demagnetizing time of the transformer.

16. The control circuit as claimed in claim 14, wherein the controller generates the switching signal in response to a demagnetizing time of the transformer.

* * * * *